(12) United States Patent
Hiramoto et al.

(10) Patent No.: US 8,163,314 B2
(45) Date of Patent: Apr. 24, 2012

(54) FLAVOR-RETENTION AGENT AND METHOD FOR USING SAME

(75) Inventors: Tadahiro Hiramoto, Kanagawa (JP); Kenji Saiki, Kanagawa (JP); Kazumasa Sakamoto, Kanagawa (JP); Satoshi Masumura, Kanagawa (JP); Toru Shimizu, Kanagawa (JP); Tomoya Yamashita, Kanagawa (JP); Fumihiro Yanaka, Kanagawa (JP); Toshinori Saima, Kanagawa (JP)

(73) Assignee: Takasago International Corporation, Tokyo (JP)

( * ) Notice: Subject to any disclaimer, the term of this patent is extended or adjusted under 35 U.S.C. 154(b) by 88 days.

(21) Appl. No.: 12/574,756

(22) Filed: Oct. 7, 2009

(65) Prior Publication Data
US 2010/0166910 A1    Jul. 1, 2010

Related U.S. Application Data

(60) Division of application No. 11/770,003, filed on Jun. 28, 2007, which is a continuation of application No. 10/098,401, filed on Mar. 18, 2002, now abandoned.

(30) Foreign Application Priority Data

Mar. 19, 2001 (JP) .................... 2001-79209

(51) Int. Cl.
*A23G 4/06* (2006.01)
(52) U.S. Cl. ............. 426/3; 426/654; 426/655; 426/637
(58) Field of Classification Search ............. 426/3, 654, 426/655, 637
See application file for complete search history.

(56) References Cited

U.S. PATENT DOCUMENTS

| 3,857,982 | A | | 12/1974 | Sevenants |
| 4,935,192 | A | | 6/1990 | Porter |
| 5,458,892 | A | * | 10/1995 | Yatka et al. ................... 426/5 |
| 5,472,732 | A | * | 12/1995 | Ohkuma et al. ............ 426/658 |
| 6,096,343 | A | | 8/2000 | Gergely et al. |
| 6,461,627 | B1 | | 10/2002 | Ichioka et al. |
| 6,555,143 | B2 | | 4/2003 | Miller et al. |
| 6,632,469 | B1 | | 10/2003 | Takahashi |

FOREIGN PATENT DOCUMENTS

| JP | 55156583 A | 12/1980 |
| JP | 4-36158 | 2/1992 |
| JP | 10-179703 A | 7/1998 |
| JP | 10-183164 A | 7/1998 |
| JP | 11-146766 A | 6/1999 |
| JP | 11/155516 A | 6/2007 |

OTHER PUBLICATIONS

Jeannette Nuessli et al., Characterization of Amylose-Flavour Complexes by DSC and X-Ray Diffraction, vol. 11, No. 1, 1997, pp. 27-34.
European Search Report.
Derwent abstract (WPI) of JP-A-9-227456.
Dictionary.com Definitions for the word "potato". Publication date unknown [Retrieved Dec. 21, 2004]. Retrieved from the Internet: <http://dictionary.reference.com/search?q=potato>.
MSN Encarta Dictionary. Definition for the word "potato". Publication date unknown [Retrieved Dec. 21, 2004]. Retrieved from the Internet: <http://encarta.msn.com/encnet/features/dictionary/DictionaryREsults.aspx?refid=1861717496>.
All About Sweet Potato on the Worldwide Gourmet. Publication date unknown [Retrieved Dec. 21, 2004]. Retrieved from the Internet: <http://gourmet.sympatico.ca/vegetables/potato/sweet.htm.
Sweet Potato. Publication date unknown [Retrieved Dec. 21, 2004]. Retrieved from the Internet: <http://wam.umd.edu/~mathewsc/Sweet.htm>.

* cited by examiner

*Primary Examiner* — Anthony Weier
(74) *Attorney, Agent, or Firm* — Sughrue Mion, PLLC

(57) ABSTRACT

The invention provides a flavor-retention agent which is harmless to the environment and the human body and exhibits excellent ability to prevent deterioration of flavors. The flavor-retention agent contains an active ingredient which is obtained by subjecting a raw material such as leaves and/or tubers of a potato plant to extraction and Method for Using Same.

3 Claims, No Drawings

FLAVOR-RETENTION AGENT AND METHOD FOR USING SAME

This is a divisional of U.S. Ser. No. 11/770,003, filed on Jun. 28, 2007, which is a continuation of application Ser. No. 10/098,401 filed Mar. 18, 2002, now abandoned, which claims priority from Japanese patent application 2001-79209, filed on Mar. 19, 2001, all of which are hereby incorporated by reference.

BACKGROUND OF THE INVENTION

1. Field of the Invention

The present invention provides an agent for preventing deterioration of perfumes, fragrances, flavors, etc. (hereinafter these are collectively called flavors, and the agent is referred to as a flavor-retention agent) obtained from natural materials, inter alia, a potato plant. More particularly, the present invention relates to a flavor-retention agent for effectively preventing deterioration of flavors for use in foods.

2. Background Art

Organic substances such as oils and fats have long been known to be denatured by oxidation or heat, resulting in deterioration or loss of the traits of the substances. For prevention of denaturation of these substances, a number of anti-oxidants have been produced and reported. Among them, BHT, ascorbic acid, tocopherol compounds, and other substances are widely used, in view of their excellent anti-oxidation properties. Particularly, anti-oxidants formed of substances such as tocopherol compounds are "environmentally friendly" and harmless to the human body. Although these harmless substances are considered to be satisfactory in those points, improvement is still desired in their ability to stabilize a target organic substance.

In order to meet recent consumer tastes, a variety of flavors are generally added to foods. However, a drawback has been pointed out, in that the added flavors deteriorate during production, processing, or storage of foods, entailing deterioration of taste of the foods.

Since most flavors for use in foods are formed of organic substances, the aforementioned known anti-oxidants; e.g., BHT, α-tocopherol, and ascorbic acid, have been added to foods in order to prevent deterioration of flavors. However, BHT and α-tocopherol exhibit poor ability to prevent deterioration of flavors, and addition of ascorbic acid to some foods causes browning.

Beyond these agents for preventing deterioration of flavors for use in foods, Beverage Japan No. 179, p. 57-(1996) discloses chlorogenic acid serving as a flavor-retention agent, and Japanese Patent Application Laid-Open (kokai) No. 9-227456 discloses a specific ester serving as a flavor-retention agent. In the former case, a large amount of chlorogenic acid must be used, and the amounts of components having unfavorable odors increase. In addition to these disadvantages, chlorogenic acid thermally decomposes, and in some cases, it imparts a certain disagreeable taste to the foods to which it has been added. In the latter case, problematically large amount of the flavor-retention agent must be used in order to attain satisfactory retention of flavors.

Thus, demand has arisen for a flavor-retention agent which is harmless to the environment and the human body and has excellent ability to prevent deterioration of flavors. Particularly, demand has arisen for a flavor-retention agent for use in foods, which can prevent deterioration of flavors and does not impair appearance of foods.

SUMMARY OF THE INVENTION

The present inventors have carried out extensive studies for obtaining a flavor-retention agent which has excellent ability to prevent deterioration of flavors, from the starting point that many naturally occurring compounds are harmless to the environment and the human body, and have found that a component obtained, through extraction, from a potato plant serving as a raw material satisfactorily overcomes the aforementioned drawbacks. The inventors have also found that the component obtained through extraction has excellent ability to prevent deterioration of flavors particularly for use in foods; is easily mixed and does not separate in foods; and does not impair the taste and appearance of foods. The present invention has been accomplished on the basis of these findings.

Thus, an object of the present invention is to provide a flavor-retention agent which is harmless to the environment and the human body and has excellent ability to prevent deterioration of flavors. Another object of the invention is to provide a flavor-retention agent which has excellent ability to prevent deterioration of flavors contained in foods; is easily mixed and does not separate in foods; and does not impair the taste and appearance of foods.

Accordingly, the present invention provides a flavor-retention agent containing a vegetable extract obtained from a potato plant.

Preferably, the vegetable extract is obtained through extraction by use of an organic solvent.

Preferably, the vegetable extract is obtained through extraction by use of water.

Preferably, the vegetable extract is obtained from the tuber of the potato plant.

The present invention also provides a flavor-retention agent for use in food which agent contains a vegetable extract obtained from a potato plant.

DETAILED DESCRIPTION OF PREFERRED EMBODIMENTS

The present invention will next be described in detail.

In order to obtain the flavor-retention agent of the present invention, tubers of a potato plant are most preferably used as a raw material. Other than tubers, stems or leaves of a potato plant may be used as a raw material.

Upon extraction, the above plant-originating raw material may be brought into contact with a solvent with no pre-treatment. However, the material is typically subjected to pre-treatment such as drying and/or cutting into flakes of appropriate dimensions.

The raw material is immersed in the solvent under predetermined conditions, and the treated raw material is separated through filtration, to thereby obtain a flavor-retention agent. The thus-obtained agent may be concentrated or purified in accordance with needs.

Separation of an active ingredient from the plant-originating raw material through extraction preferably employs one or more solvents selected from among water, lower alcohols, hydrous lower alcohols, polyol organic solvents, petroleum ether, ethyl acetate, methyl acetate, chloroform, and hydrocarbons.

As used herein, the term "lower alcohols" refers to alcohols having 1-4 carbon atoms. Of these, methanol, ethanol, etc. are particularly preferred. The hydrous alcohols which can be used in the present invention contain water in an amount of 10-75 wt. %.

Examples of the polyol organic solvents include ethylene glycol and propylene glycol.

Commercial products of petroleum ether, ethyl acetate, methyl acetate, and chloroform are typically used.

Examples of hydrocarbon solvents include aliphatic hydrocarbons, alicyclic hydrocarbons, and aromatic hydrocarbons which are typically liquid at ambient temperature. Of these, aliphatic and aromatic hydrocarbons which are typically liquid at ambient temperature are preferred, with hydrocarbons such as n-hexane and toluene being particularly preferred.

No particular limitation is imposed on the extraction operation. Typically, a plant-originating material is immersed in the above solvent at room temperature to 80° C. or gently stirred in the solvent at a same temperature falling within the above range, to thereby effect extraction.

If a known extraction apparatus such as Soxhlet's extractor is employed, a target extract can be obtained more effectively.

The time required for extraction is generally 30 minutes to 12 hours. A conventionally known multi-stage extraction technique may be employed.

In the context of the present specification, the extract of the present invention encompasses, in addition to the extracts which are obtained through any of the above methods, one or more extracts which are obtained by subjecting any of the above extracts to a certain treatment; for example, a concentrate which is obtained by removing a solvent from an extract (so-called concentrated extract), or a product which is obtained by removing a specific compound from the extract.

The extract of the present invention also encompasses a product obtained, through extraction, from a residue which is formed by cutting the plant-originating raw material and subjecting the resultant fragments to steam distillation.

The vegetable extract obtained through the aforementioned procedure can be used as the flavor-retention agent of the present invention. The agent of the present invention may be used in combination with an additional known stabilizer.

The thus-prepared flavor-retention agent is added to a target object containing a compound which tends to be deteriorated, thereby preventing deterioration of the compound contained in the target object.

No particular limitation is imposed on the target object, and examples thereof include foods, fragrances, make-up base or skin care cosmetics, hair cosmetics, toiletries, bath-additive products, body-care products, detergents and finishing agents, aromatic deodorants, and pharmaceuticals.

Examples of the above foods include beverages such as fruit-juice-free drinks, fruit juice drinks, lactic acid bacteria drinks, and powdered drinks; cold desserts such as ice creams, sherbets, and frozen desserts; desserts such as puddings, jellies, Bavarian creams, and yogurts; other sweets such as gums and candies; and surimi-based fishery products.

Examples of the above fragrances include perfumes, eau de toilet, eau de Cologne, and shower cologne.

Examples of the above make-up base or skin care cosmetics include skin creams, cleansing creams, cosmetic lotions, after-shave lotions, foundation creams, lipsticks, and talcum powders.

Examples of the above hair cosmetics include hair washes such as shampoos, rinses, conditioners, rinse-in-shampoos, and hair-treatment materials; hair dressings such as pomade, hair tonics, hair liquids, and hair gels; hair growers; hair dyes; and cold wave agents.

Examples of the above toiletries include cosmetic soap, bath soap, and solid soap of high transparency.

Examples of the above bath additive products include bath salt powders, bath salt cakes, effervescent bath salt cakes, bath oils, and bubble-bath products.

Examples of the above detergents include powder detergents for clothing, liquid detergents for clothing, finishing agents for softening clothes, kitchen detergents, detergents for toilets, detergents for bathroom use, glass cleaners, and mold removers.

Examples of the above aromatic deodorants include gel-type aromatic deodorants, liquid aromatic deodorants, impregnation-type aerosol aromatic deodorants, and mist-type aromatic deodorants.

Example forms of the above pharmaceuticals include tablets, liquids, capsules, and granules.

The amount of the flavor-retention agent to be added to a target object varies greatly in accordance with the type of the target object or other conditions. However, the agent is added to a target object typically in an amount of 1 ppm to 10 wt. % based on the weight of the target object, or may be added in an excessive amount.

The flavor-retention agent of the present invention may be added directly to any of the above target objects. However, typically, a solution or a dispersion containing the flavor-retention agent is prepared in advance, and the thus-prepared solution or dispersion is added to the target object. The solution or dispersion prepared in advance may also contain additives such as a thickener, a surfactant, an anti-oxidant, and a known flavor-retention agent.

Examples of the medium (solvent) for producing the above solution or dispersion include water, ethanol, middle-chain fatty acid esters such as glycerin, refined vegetable oils such as palm oil or corn-derived salad oil, and edible oils.

The amount of the flavor-retention agent to be added to the medium (solvent) varies greatly in accordance with the type of the solvent or other conditions. However, the agent is added to the medium, for example, in an amount of 10 ppm to 50 wt. % based on the medium (solvent).

Among the aforementioned flavors whose deterioration is to be prevented, the flavors for use in foods are known to be added to foods for artificially generating the flavor and taste of the foods. Examples of the flavors for use in foods include natural flavor materials such as essential oils, extracts, oleoresins, recovered flavors, and isolated perfumes; and synthetic flavor materials such as alcohols, esters, aldehydes, acetals, and lactones. These materials may be used singly or in combination of two or more species.

Examples of preferable flavors for use in foods, as classified in accordance with a classification method known in the art, include essences of citrus fruits such as lemons, grapefruits, and oranges; essences of soft fruits such as apples, melons, grapes, peaches, and pineapples; flavors of favorite beverages such as black tea, green tea, Oolong tea, and coffee; milk product flavors; vanilla flavors; mint flavors; flavors of spices; nutty flavors; and meat and seafood flavors.

The flavor-retention agent of the present invention for use in foods is also effective for preventing deterioration of cold-pressed essential oils produced from lemons or oranges and for preventing deterioration of intrinsic flavor components which the food per se contains.

EXAMPLES

The present invention will next be described in more detail by way of the below-described Examples and Comparative Examples, which should not be construed as limiting the invention thereto.

Example 1

A dried form of potato tubers (100 g) was pulverized by means of a mill, and ethanol (1,000 ml) was added to the pulverized matter. The resultant mixture was refluxed for 3 hours, and the ethanol phase was separated. The ethanol phase was concentrated to solid, and additional ethanol was added to the solid for dissolution, to thereby prepare an extract. The yield of the extract (as reduced to solid, based on the dried potato product) was found to be 1.5 wt. %.

Test Example 1

The extract which had been produced in Example 1 and serves as a flavor-retention agent was incorporated into chewing gum, and the effect of preventing deterioration of a flavor contained in the chewing gum was investigated in the following manner.

| Formulation of chewing gum | |
| --- | --- |
| Gum base | 21% |
| Glucose syrup | 13% |
| Lemon flavor | 1% |
| Citric acid | 1% |
| Potato tuber extract | Amount shown Table 1 |
| Powdered sugar | Suitable amount |
| Total | 100% |

Preparation Method

Gum base, powdered sugar, and glucose syrup were sufficiently kneaded by means of a kneader, Citric acid was added to the kneaded product, and the resultant mixture was further kneaded. Subsequently, a lemon flavor and an ethanol solution of the potato tuber extract were added to the mixture, and kneading was continued at 50° C. for 30 minutes so as to attain sufficient kneading. The thus-yielded product was extruded, to thereby produces sticks (10 mm×50 mm×2 mm) of chewing gum.
Deterioration test conditions: 72 hours in an incubator at 40° C. under irradiation at 6,000 lx/hr
Method of Sensory Evaluation The taste and flavor of the test pieces (gum sticks) which had been stored under the above conditions (for deterioration test) were evaluated through a sensory test conducted by ten expert panelists.
Sensory Ratings:
  AA: No substantial change in taste and flavor
  BB: Slight change in taste and flavor
  CC: Clear change in taste and flavor
  DD: Drastic change in taste and flavor
  The results are shown in Table 1.

Comparative Example 1

α-Tocopherol

The procedure of Test Example 1 was repeated, except that, in place of the extract of the present invention, α-tocopherol (commercial product) was added in an amount shown in Table 1, to thereby produce similar chewing gum sticks. The test pieces (gum sticks) were stored under the same conditions (for deterioration test) as those employed in Test Example 1, and the taste and flavor thereof were evaluated through a sensory test.
The results are shown in Table 1.

Comparative Example 2

Control

The procedure of Test Example 1 was repeated, except that no flavor-retention agent was added, to thereby produce similar chewing gum sticks. The test pieces (gum sticks) were stored under the same conditions (for deterioration test) as those employed in Test Example 1 and the taste and flavor thereof were evaluated through a sensory test.
The results are shown in Table 1.

TABLE 1

| | Agent | Concentration of added agent (ppm) | Evaluation in Sensory test |
| --- | --- | --- | --- |
| Comp. Ex. 1 | α-tocopherol | 20 | CC |
| | | 1 | DD |
| Comp. Ex. 2 | control | — | DD |
| Example 1 | potato tuber extract | 20 | AA |
| | | 1 | AA |
| | | 0.1 | BB |

Test Example 2

Effect of preventing heat-induced or light-induced deterioration of a lemon flavor contained in a carbonated beverage A lemon-flavored carbonated beverage (Brix: 10.0, gas pressure: 2.5 kg/m$^2$) containing the flavor-retention agent of Example 1 was prepared in accordance with the following formulation.

| Formulation of lemon-flavored carbonated beverage | |
| --- | --- |
| High fructose corn syrup | 127 g |
| Citric acid | 1.24 g |
| Water | 200 ml |
| Lemon flavor | 0.12 g |
| Flavor-retention agent (ethanol solution) | Predetermined amount |
| Carbonated water | Suitable amount |
| Total | 1,000 ml |

Preparation Method

High fructose corn syrup and citric acid were dissolved in water, to thereby prepare a syrup. To the prepared syrup, a lemon flavor and an ethanol solution of the flavor-retention agent were added, and the mixture was stirred. Carbonated water was added to the stirred mixture, to thereby adjust the total volume to 1,000 ml.

The lemon-flavored carbonate beverage was allowed to stand with light irradiation under the following storage conditions (for light-deterioration test).
Light-Deterioration Test Conditions:
  Quantity of light: 15,000 lx/hr
  Temperature: 20° C.
  Time for storage: 7 days The taste and flavor of the lemon-flavored carbonated beverage which had been stored under the above conditions were evaluated through a sensory test conducted by ten expert panelists.
Sensory Ratings:
  AA: No substantial change in taste and flavor
  BB: Slight change in taste and flavor
  CC: Clear change in taste and flavor
  DD: Drastic change in taste and flavor
  The results are shown in Table 2.

The lemon-flavored carbonate beverage was allowed to stand with heating under the following storage conditions (heat-deterioration test).

Heat-Deterioration Test Conditions:
   Quantity of light: Dark
   Temperature: 37° C.
   Time for storage: 7 days
   The taste and flavor of the lemon-flavored carbonated beverage which had been stored under the above conditions were evaluated through a sensory test conducted by ten expert panelists.
Sensory Ratings:
   AA: No substantial change in taste and flavor
   BB: Slight change in taste and flavor
   CC: Clear change in taste and flavor
   DD: Drastic change in taste and flavor
   The results are shown in Table 3.

Comparative Example 3

The procedure of Example 2 was repeated, except that chlorogenic acid (commercial product) was incorporated into a lemon-flavored carbonate beverage in an amount shown in Table 2 or 3. The thus-prepared beverage was subjected to the two types of deterioration tests under the same conditions as those employed in Test Example 2, and the taste and flavor thereof were evaluated through a sensory test.
   The results are shown in Tables 2 and 3.

Comparative Example 4

The procedure of Example 2 was repeated, except that ascorbic acid (commercial product) was incorporated into a lemon-flavored carbonated beverage in an amount shown in Table 2 or 3. The thus-prepared beverage was subjected to the two types of deterioration tests under the same conditions as those employed in Test Example 2, and the taste and flavor thereof were evaluated through a sensory test.
   The results are shown in Tables 2 and 3.

Comparative Example 5

The procedure of Example 2 was repeated, except that no flavor-retention agent was incorporated into a lemon-flavored carbonated beverage. The thus-prepared beverage was subjected to the two types of deterioration tests under the same conditions as those employed in Test Example 2, and the taste and flavor thereof were evaluated through a sensory test.
   The results are shown in Tables 2 and 3.

TABLE 2

| | | Light-deterioration test | |
|---|---|---|---|
| | Agent | Concentration of added agent (ppm) | Evaluation in sensory test |
| Comp. Ex. 3 | chlorogenic acid | 100 | AA |
| | | 50 | BB |
| | | 30 | DD |

TABLE 2-continued

| | | Light-deterioration test | |
|---|---|---|---|
| | Agent | Concentration of added agent (ppm) | Evaluation in sensory test |
| Comp. Ex. 4 | ascorbic acid | 100 | DD |
| Comp. Ex. 5 | control | — | DD |
| Example 1 | potato tuber extract | 1 | AA |
| | | 0.1 | AA |
| | | 0.01 | BB |

TABLE 3

| | | Heat-deterioration test | |
|---|---|---|---|
| | Agent | Concentration of added agent (ppm) | Evaluation in sensory test |
| Comp. Ex. 3 | chlorogenic acid | 100 | DD |
| Comp. Ex. 4 | ascorbic acid | 100 | DD |
| Comp. Ex. 5 | control | — | DD |
| Example 1 | potato tuber extract | 1 | AA |
| | | 0.1 | AA |
| | | 0.01 | BB |

As described hereinabove, the flavor-retention agent of the present invention obtained from a natural material is harmless to the human body and "friendly" to the global environment, and exhibits excellent ability to prevent deterioration of flavors. When the flavor-retention agent is added to food, a flavor contained in the food deteriorates less, and the taste of the food can be maintained for a long period of time, thus providing great advantages.

What is claimed is:
1. An article, comprising a target object and a flavor-retention agent containing a potato tuber extract, wherein the target object is a chewing gum, wherein the agent is an agent for preventing deterioration of flavor of the target object, and wherein the article contains a total of from 0.1 to 20 ppm of the agent.
2. A method for preventing deterioration of flavor of a target object, comprising adding an agent comprising a potato tuber extract to the target object, wherein the target object is a chewing gum and wherein the agent is added in a total amount of from 0.1 to 20 ppm.
3. A method for preventing deterioration of flavor of a target object, comprising adding an agent comprising a potato tuber extract to the target object, wherein the target object is a chewing gum and wherein the agent is added in a total amount of from 1 to 20 ppm.

* * * * *